Feb. 4, 1969   S. B. KITA   3,425,197
VEHICLE GUIDANCE APPARATUS
Filed Aug. 7, 1967
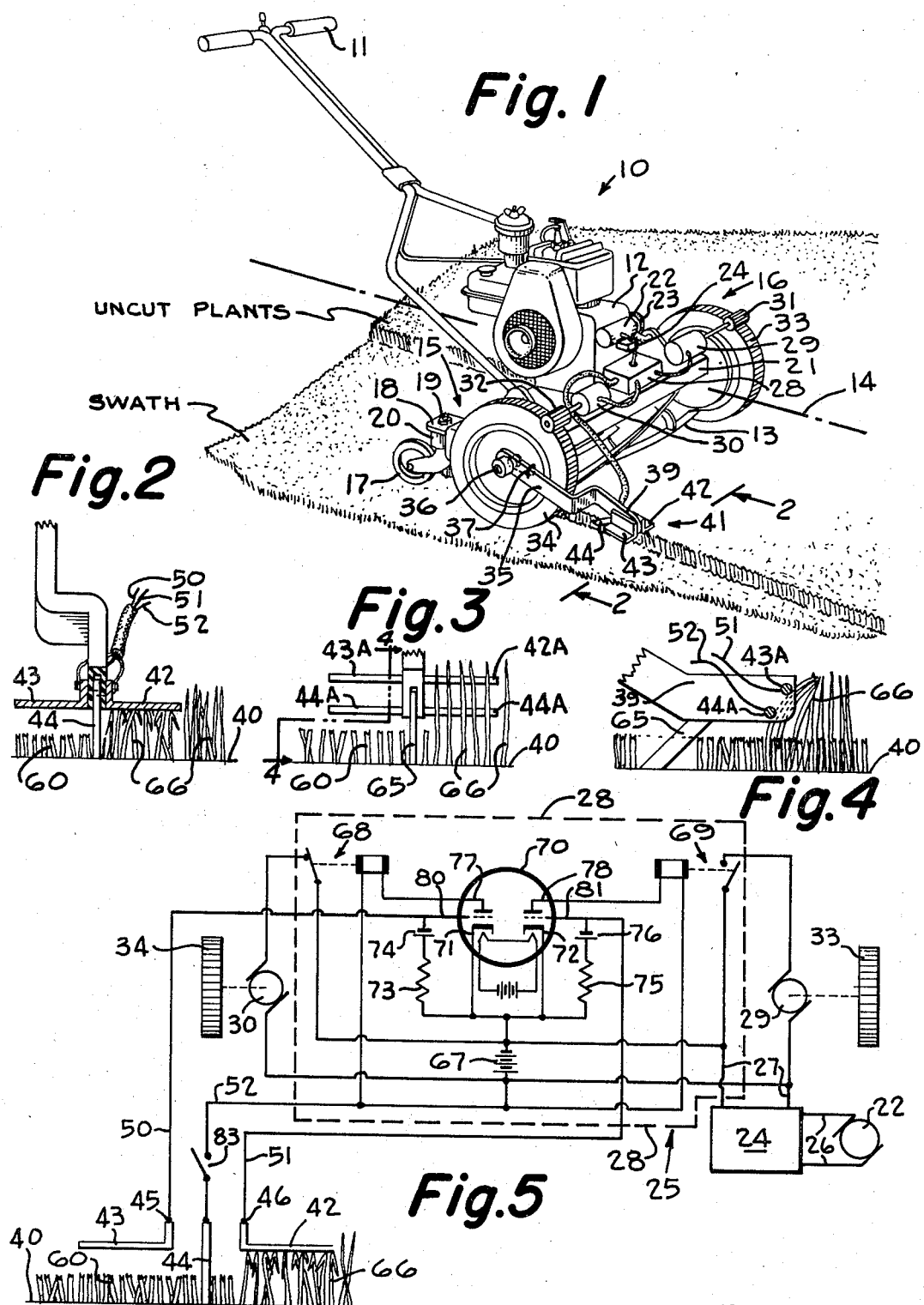
INVENTOR
STANLEY B. KITA United States Patent Office 3,425,197
Patented Feb. 4, 1969

3,425,197
VEHICLE GUIDANCE APPARATUS
Stanley Bernard Kita, Lansdale, Pa.
(30 Valley Green Road, Doylestown, Pa. 18901)
Filed Aug. 7, 1967, Ser. No. 658,858
U.S. Cl. 56—26                                    7 Claims
Int. Cl. A01d 35/24, 75/28; B62d 5/04

ABSTRACT OF THE DISCLOSURE

An electrically energized conductor is positioned on a self-propelled crop-cutting vehicle at an elevation sufficiently close to ground level to contact uncut plants standing adjacent to a swath of plants. The energized conductor produces an electrical current in the contacted uncut plants in response to a predetermined orientation of the vehicle relative to the swath. This current, after amplification, actuates a powered steering apparatus which maintains the vehicle in alignment with the edge of the swath so that the vehicle operates on uncut plants standing adjacent thereto.

Background of the invention

The many attempts which have been made to produce a fully automatic crop harvester have met with varying degrees of success. Tethered devices such as disclosed in U.S. Patent 2,796,944, are limited in application to harvesting substantially circular or oval crop areas. Machines which follow guide wires embedded in the soil, as illustrated in U.S. Patent 3,073,409, require substantial lengths of wire and are restricted to harvesting perennial crops, since tilling the soil for planting annual crops would disturb the soil embedded guide wires. Harvesters of the type which utilize a fluidly applied fugitive ground trace as a guide path, such as disclosed in U.S. Patent 3,095,939, also possess certain disadvantages. One of these disadvantages lies in the fact that their operation is limited to a narrow range of soil conditions, since, the application of water ground trace to wet soil would not yield a measurable differential in soil conductivity collateral to the trace which is essential for proper machine guidance. Also very hot and dry soil would quickly absorb or evaporate the water trace thereby limiting the effective length of the guide path to small crop perimeters.

It is, therefore, an object of this invention to provide an automatic guidance apparatus for vehicles.

It is another object to provide an automatic crop harvester with guidance apparatus which does not require any special guide-path producing means.

It is a further object of this invention to provide a crop harvester which will automatically harvest a preselected crop area independently of soil or weather conditions.

A still further object of this invention is to provide an automatic crop harvester which will harvest annual as well as perennial crops, and which is not restricted to any crop area or crop area configuration.

Other objects, features and advantages will become apparent from the following summary and description taken in conjunction with the accompanying drawings.

Summary of the invention

An electrical conductor is positioned on a steerable, self-propelled, crop-cutting vehicle forwardly of the crop cutters and to one side of the vehicle longitudinal axis. The conductor is supported close to ground level at an elevation sufficiently high to clear a swath of plants but low enough to contact uncut plants standing adjacent to the swath. An electrically conductive member, also located on the vehicle, has a surface portion which is maintained in good electrical communication with the ground surface. An electrical potential, applied between the conductive member and the conductor, produces a current flow in uncut plants standing adjacent to the swath when the conductor is brought into contact therewith. This current flow is representative of the alignment of the vehicle with the swath and, after amplification, produces a signal which actuates the vehicle steering apparatus to maintain the vehicle in alignment with the swath as it proceeds therealong cutting plants which are standing adjacent thereto.

Brief description of the drawings

FIG. 1 is a perspective view of a lawn mower embodying features of the invention.

FIG. 2 is an enlarged, fragmentary, cross-sectional view taken along line 2—2 of FIG. 1 looking in the direction of the arrows.

FIG. 3 is an enlarged, front elevational view of the arm of FIG. 2 adapted to support a modified sensor arrangement.

FIG. 4 is an enlarged, cross-sectional, side elevational view of the sensor arrangement of FIG. 3 taken along line 4—4.

FIG. 5 is a schematic diagram illustrating the electrical circuit employed in the preferred embodiment of the invention.

Description of the preferred embodiments

In one aspect of the invention a power lawn mower shown generally at 10 (FIG. 1), having a handle 11, an internal combustion engine 12, and a reel-type cutter assembly 13, is provided with an electrical plant sensor 41 for automatically guiding the mower in the absence of an operator. A central longitudinal reference axis 14 extends in the general direction of mower movement and divides the mower into right and left hand portions shown generally at 15 and 16 respectively. Follower wheel 17, which facilitates the automatic steering of mower 10, has a yoke with a vertical shaft 19 which is freely rotatable within a journal 20 in a rearwardly protruding portion 18 of the mower frame 21.

Securely attached to engine 12 is an electrical generator 22 rotated by a belt 23 which engages a power take-off on the engine shaft (not shown). A voltage regulator 24 is connected to generator 22 and circuit 25, shown generally in FIG. 5, by insulated wires 26 and 27 respectively. A housing or container 28, attached to mower frame 21 forwardly of engine 12, provides a dust tight and waterproof enclosure for circuit 25.

Two electric motors 29 and 30 are firmly secured to frame 21 with the drive shaft of each motor pointing outwardly from mower axis 14. Serrated or grooved drive wheels 31 and 32 are connected to the shafts of motors 29 and 30 respectively, and are maintained in frictional engagement with mower wheels 33 and 34. Drive means other than frictional may be employed where desired; with conventional belt or chain drives providing adequate substitutes.

Right mower wheel 34 and left mower wheel 33 are rotatably mounted on mower frame 21 by suitable journal arrangements. Since selective driving of wheels 33 and 34 steers the mower, these wheels should rotate independently of each other and of the rotation of reel cutter assembly 13, which may be powered by direct coupling with engine 12.

An elongated arm 35 (FIG. 1) is pivotally connected to shaft 36 and is held in place by conventional connecting means. A torsion spring 37 biases arm 35 downwardly so that arm forward portion 39 is urged into proximity with ground surface 40.

An electrical plant sensor, shown generally at 41 (FIG. 1), attached to mower 10 outwardly from axis 14, is secured to arm forward portion 39 by conventional mechanical connectors (not shown). Arm 35 should be formed so that mower cutter assembly 13 will overlap a portion of the swath, and whether arm 35 is located on the right or left side of the mower axis is immaterial to the invention. Arm forward portion 39 should be formed from an electrical insulation material so that sensor conductors 42 and 43 will be insulatably spaced apart. Electrically conductive member 44 is also secured to an arm portion 39 for contacting ground surface 40 as shown in FIG. 2. Suitable terminals 45 and 46 are connected to conductors 43 and 42 respectively to facilitate wiring thereof into circuit 25, and conductors 43 and 42, and member 44 are connected to circuit 25 by wires 50, 51 and 52 respectively.

Electrical conductors 43 and 42 are generally rectangular in shape with the rectangle length positioned generally parallel to the vehicle axis 14. Although both conductors are shown to be similar in size and shape, the invention should not be construed to be limited to those shapes since other shapes would be operative. It is only essential that the conductors have an area of configuration sufficient to contact enough plants to maintain operative continuity in circuit 25.

Conductor 43, connected to arm portion 39, is supported substantially parallel to ground surface 40 at an elevation sufficient to clear the uppermost projecting portions of plants 60 in the swath. Conductor 43 must also be close enough to ground surface 40 to enable it to contact uncut plants standing next to the swath when mower 10 and conductor 43 are moved to the left and inwardly toward uncut plants 66. Conductor 42 is also rectangularly shaped, however, it should be noted that the shapes or sizes of conductors 42 and 43 need not be identical nor is it essential that they be supported at equal elevations above ground surface 40. It is only necessary that conductor 42 be supported substantially parallel to ground surface 40, and, similarly to conductor 43, be of sufficient size to contact an adequate number of uncut plants to maintain operative continuity in circuit 25. The material from which conductors 42 and 43 are fabricated is preferably copper, although other good electrical conductors would provide adequate substitutes.

Electrically conductive member 44 (FIGS. 1, 2), connected to arm portion 39 by suitable mechanical connectors, is shaped to provide good electrical contact with ground surface 40. Member 44 should be made from a spring-like conductive material such as beryllium-copper or the like, and should possess sufficient rigidity to maintain conductors 42 and 43 at the aforementioned predetermined elevations above ground surface 40. As one skilled in the art would readily perceive, a wheel could be substituted for member 44 and, if desired, member 44 could be secured to mower 10 at some other location. Good electrical communication between member 44 and ground surface 40 is essential however, regardless of the supporting structure or location of member 44.

A modified sensor arrangement, depicted in FIGS. 3 and 4, has right and left electrical conductors 43A and 42A respectively, and an electrically conductive member 44A. These conductors are formed from elongated, preferably copper rods, and are secured to arm portion 39 by any suitable connecting means. Supporting arm 65 maintains conductors 42A, 43A and 44A at proper elevations above ground surface 40. Similarly to conductors 42 and 43 in FIG. 1, conductors 42A and 43A are supported substantially parallel to ground surface 40, and at elevations which enable them to function as do conductors 42 and 43. In this modification, however, member 44 does not electrically communicate with ground surface 40, but rather member 44A is supported parallel to surface 40 at an elevation which enables it to contact uncut plants 66. It is preferable for member 44A to be positioned slightly rearwardly of members 42A and 43A as shown in FIG. 4, so that plants 66 contact both members 42A and 44A simultaneously. The reasons for this will become apparent later in the specification. It is sufficient here to note that an electrical current will pass through plants 66 from conductors 43A or 42A to conductor 44A and, in the arrangement of FIG. 2, from conductors 43 or 42 through plants 66 to member 44.

Circuit 25 (FIG. 5), connected to a source of electrical energy by wires 26 and 27, has a storage battery 67. Battery 67 is connected to normally closed relay 68 and right wheel drive motor 30 as well as normally open relay 69 and left wheel drive motor 29. These circuits constitute the drive circuits.

An amplifier circuit is formed having a dual triode 70 with heated cathodes 71 and 72 which are connected to the negative terminal of battery 67. Connected in parallel with cathode 71, intermediate the battery negative terminal and grid 80, is resistor 73 and a grid bias voltage source 74. Resistor 75 and voltage source 76 are similarly connected to grid 81. Triode plate 77 is connected to relay coil 68 and the battery positive terminal, and plate 78 is similarly connected to relay coil 69. Grids 80 and 81 are connected to conductors 43 and 42 by insulated wires 50 and 51 respectively. Member 44 is connected to the battery positive terminal by wire 52 with switch 83 being wired in series therewith.

The operation of the invention will now be described. Engine 12 is started and cutter assembly 13 is engaged. An operator cuts a swath around the perimeter of a crop area to establish a fugitive path; the path being defined by the elevational difference between plants forming an uncut upper vegetation level and plants in the contiguous swath. Having thus established a path, switch 83 is closed. With mower axis 14 aligned parallel to the swath edge or path, the position of sensor 41 will be as shown in FIG. 1. In this position conductor 42 will be in contact with plants 66 and conductor 43 will be spaced from precut plants 60. By virtue of circuit 25 an electrical potential is applied between conductor 42 and member 44 which causes a current to flow through contacted plants 66. This current flow is a minute quantity, since plant electrical resistance generally runs into the megohm range and thus, amplification is necessary. As current flows through resistor 75 a voltage drop occurs, the grid bias voltage changes, and current, sufficient to energize relay 69, flows in the drive circuit. Motor 29 will then rotate wheel 33 to drive mower 10 forwardly. Since rotation of only one wheel will cause the mower to turn out of alignment with the swath, it is necessary in normal straight-line operation for both wheels to be rotating at approximately the same speed. This is achieved by energizing the drive circuit for right wheel 34 by employing normally closed relay 68. With both wheels driving the mower will proceed in a substantially straight line. If for some reason the mower should turn inwardly toward uncut plants 66 adjacent to the swath, conductor 43 will contact those plants and de-energize the drive circuit for wheel 34 by opening the contacts of relay 68. This will cause wheel 34 to stop rotating and wheel 33, still rotating, will urge the mower and conductor 42 out of contact with plants 66 at which time both wheels will again begin to rotate. When the mower turns outwardly away from uncut plants 66, conductor 42 will break contact with plants 66 and wheel 33 will stop rotating. Rotation of wheel 34 will urge mower 10 inwardly toward plants 66 until conductor 42 again makes contact with plants 66 and both wheels rotate. This "hunting" of the swath edge will continue as long as the mower is not in alignment therewith and until the entire area of uncut plants standing adjacent to the swath has been cut. When the entire crop has been severed the mower will rotate in a tight circle until the operator takes control thereof and opens switch 83 or turns off engine 12.

The modified sensor arrangement of FIG. 3 operates similarly to the aforementioned preferred arrangement, however in the modified sensor, electrical current passes only from conductors 42A or 43A to member 44A through plants 66.

It is envisioned that an operable guidance apparatus could be constructed with utilizes only one conductor 42 and 43 in conjunction therewith. For example, if conductor 42 were removed and wheel 34 was driven at a predetermined speed, then mower 10 would be biased inwardly toward uncut plants 66. When conductor 43 contacts plants 66 wheel 33 would begin to rotate to urge the mower outwardly from the uncut plants. The rates of rotation of wheels 34 and 33 could be adjusted so that mower 10 would proceed along the swath edge with as little "hunting" as possible.

As one skilled in the art would readily observe, there are many steering arrangements which might be employed in lieu of the one disclosed. In some instances, for example, it may be desirable to use conventional belt or chain drives with magnetic clutches for selectively driving wheels 33 or 34; in which case mower steering would be substantially the same as with the disclosed electric motors. Steering could also be effected by providing follower wheel 17 with a tiller on shaft 19, and perhaps using a motor or expansion cylinder operated by engine manifold vacuum to apply the required steering force to the tiller. Since any of the aforementioned steering and drive means would be equally desirable, the invention should not be construed to be limited to the steering and drive means as described in the preferred embodiment. Also, it is expected that an artisan could construct a steering and circuit arrangement that would measure mower-swath-edge alignment and apply smooth or incremental course changes to the mower while advancing along the swath.

While the invention would be most advantageously used in conjunction with lawn mowers or other crop harvesters, it may be employed successfully with any vehicle for which automatic guidance along a swath edge is desired. Therefore within the spirit of the invention, various modifications, alterations or changes may be resorted to without departing from its scope as defined in the following claims.

I claim:
1. An apparatus for guiding a self-propelled vehicle along a fugitive path through plants forming an upper vegetation level above a supporting surface, the path being defined by an elevational difference between the upper vegetation level and a swath of plants defining a generally uniform level below and contiguous to the upper level, the apparatus comprising an upper electrical conductor secured to the vehicle and positioned at a predetermined elevation above the surface, the conductor being adapted to normally overlie the swath of plants a spaced distance therefrom and to contact the upper vegetation level plants upon a predetermined amount of vehicle misalignment relative to the path, a lower electrical conductor attached to the vehicle and disposed below and substantially parallel with the upper conductor for providing electrical communication with the plants, electrical circuit means connected to the upper and lower conductors, the circuit means having a source of electrical energy for producing a current flow between the conductors through plants which have been operatively interposed therebetween, the circuit means also having an amplifier for producing a signal in response to the current flow, and means connected to the circuit means for steering the vehicle in response to the signal, the steering means normally biasing the vehicle into the upper vegetation level while the vehicle is advancing along the path so that the conductors operatively contact the plants in the upper vegetation level upon a predetermined amount of vehicle inward bias, whereby the circuit means actuates the steering means to urge the vehicle outwardly of the upper vegetation level and the conductors out of their operative contact with the plants.

2. Apparatus in accordance with claim 1 wherein the upper conductor is positioned forwardly of the lower conductor and the conductors are disposed transversely to the normal path of movement of the vehicle, so that as the vehicle advances along the swath, the conductors sweep across the upper portions of the contacted plants to provide continuous electrical communication with the plants.

3. Apparatus in accordance with claim 1 wherein the conductors are mounted on the vehicle for vertical displacement in response to undulations in the supporting surface, whereby the conductors are properly spaced from the supporting surface as the vehicle advances along the swath.

4. Apparatus for guiding a self-propelled vehicle along a fugitive path through plants forming an upper vegetation level above a supporting surface, the path being defined by an elevational difference betwen the upper vegetation level and a swath of plants defining a generally uniform level below and contiguous to the upper level, the apparatus comprising sensor means for operatively electrically contacting plants in the upper vegetation level, the sensor means having first and second horizontally spaced apart electrical conductors each having a substantially flat surface portion confronting the supporting surface and mounted on the vehicle at a predetermined elevation above the surface to sweep across a plurality of upper level plants, the first conductor being positioned to normally overlie the swath of plants at a predetermined spaced distance therefrom and to contact plants in the upper vegetation level upon a predetermined amount of vehicle misalignment relative to the path, the second conductor being positioned to normally contact plants in the upper vegetation level, the conductors being mounted to move vertically in response to undulations in the supporting surface as the vehicle advances along the swath, an electrically conductive member engaging the supporting surface and mounted for vertical displacement with the conductors in response to the surface undulations to provide electrical communication with the plants, electrical circuit means connected to the first and second conductors and the electrically conducted member, the circuit means having a source of electrical energy for producing a current flow in separate circuits formed between the first conductor and the member and the second conductor and the member by contacted plants in the upper vegetation level when the contacted plants are operatively interposed therebetween, the circuit means also having an amplifier for producing a signal in response to current flow in the separate circuits, and steering means responsive to the signal for maintaining the vehicle in alignment with the path as the vehicle advances therealong.

5. Apparatus according to claim 4 wherein the electrical conductors are elongated in the direction of vehicle movement and are supported to pivot on a horizontal axis, and the conductors are biased downwardly toward the supporting surface so that the plants in the upper vegetation level are operatively compressed between the conductors and the supporting surface to effect positive electrical contact therebetween.

6. Apparatus according to claim 4 wherein the electrically conductive member is disposed between the conductors and supports the conductors above the supporting surface, so that the conductors are properly spaced from the supporting surface as the vehicle advances along the swath.

7. Apparatus in accordance with claim 4 wherein the vehicle mounts a plant cutter for cutting a swath transversely to the normal path of movement of the vehicle, and the sensor means is carried by an arm projecting forwardly of the cutter and biased downwardly toward the supporting surface to operatively engage the plants.

References Cited

UNITED STATES PATENTS

| | | | |
|---|---|---|---|
| 2,815,633 | 12/1957 | Meyer | 56—25.4 |
| 2,847,077 | 8/1958 | Vaughan | 180—79.1 |
| 2,941,346 | 6/1960 | Perry | 56—26 |
| 2,981,355 | 4/1961 | Rabuse | 180—79.1 |

ABRAHAM G. STONE, *Primary Examiner.*

PASQUALE A. RAZZANO, *Assistant Examiner.*

U.S. Cl. X.R.

180—79.1